United States Patent [19]

Schutzler

[11] 3,844,167
[45] Oct. 29, 1974

[54] TRIAXIAL TENSILE STRESS DEVICE

[75] Inventor: Jerome C. Schutzler, Irvine, Calif.

[73] Assignee: McDonnell Douglas Corporation, Santa Monica, Calif.

[22] Filed: Sept. 4, 1973

[21] Appl. No.: 393,707

[52] U.S. Cl. .................................................. 73/93
[51] Int. Cl. ........................................... G01n 3/00
[58] Field of Search ..................... 73/93, 95, 88 R; 192/105 A

[56] References Cited
UNITED STATES PATENTS
3,554,341  1/1971  Anderson ........................ 192/105 A
FOREIGN PATENTS OR APPLICATIONS
219,836  9/1968  U.S.S.R. ................................ 73/95

Primary Examiner—Jerry W. Myracle
Attorney, Agent, or Firm—Robert O. Richardson; Walter J. Jason; Donald L. Royer

[57] ABSTRACT

A device for placing a specimen under tensile stresses in axial, radial and circumferential directions simultaneously to determine its failure characteristics. A solid cylindrical billet of material is rotated about its line of symmetry to develop radial and circumferential stresses due to centrifugal forces which also are utilized simultaneously to apply axial tension to the billet.

9 Claims, 4 Drawing Figures

PATENTED OCT 29 1974　　　3,844,167
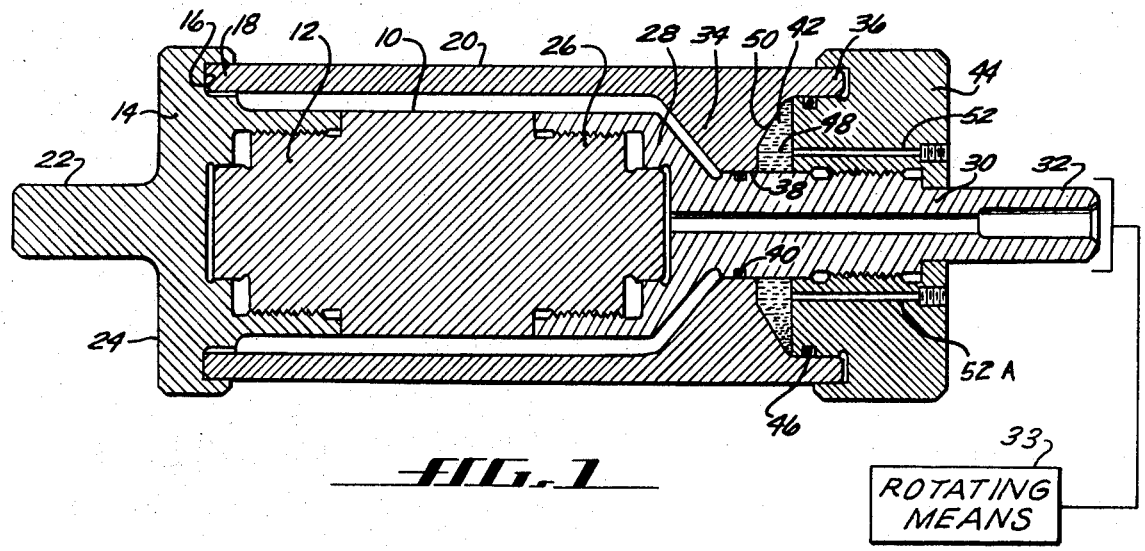
FIG. 1
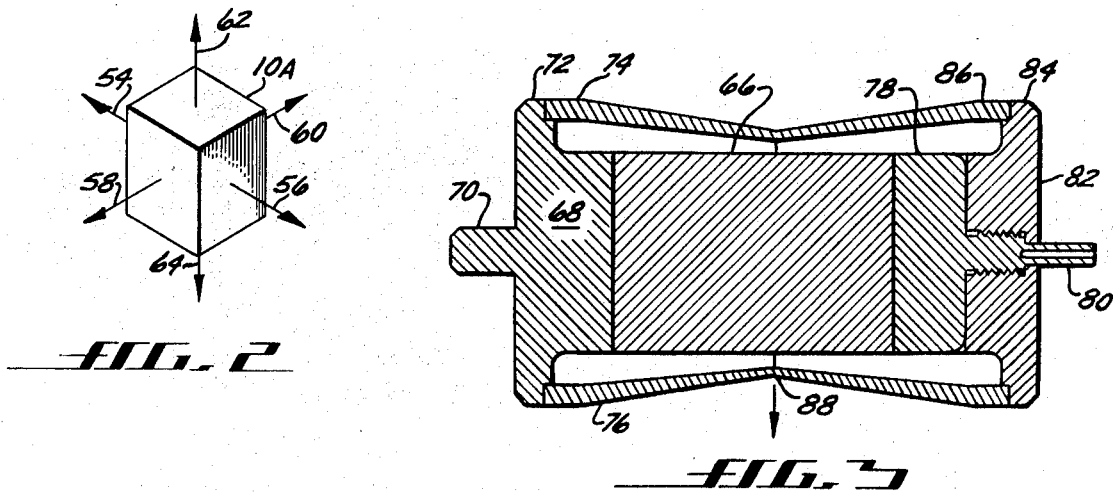
FIG. 2
FIG. 3
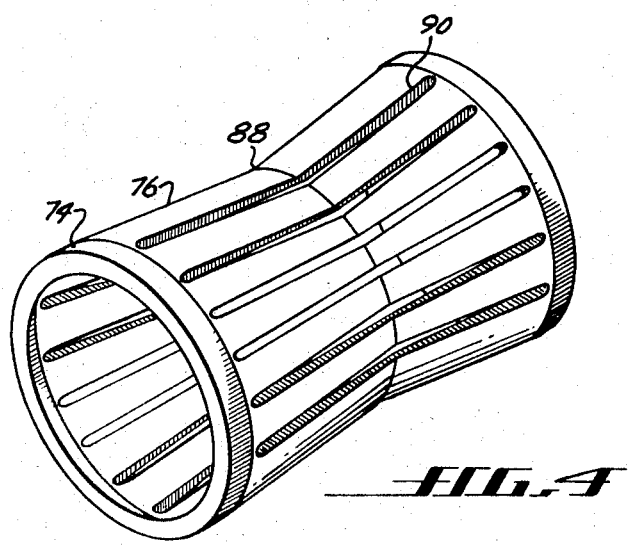
FIG. 4

# TRIAXIAL TENSILE STRESS DEVICE

BACKGROUND OF THE PRESENT INVENTION

Material testing is done to insure reliability of brittle material billets before parts are excized from the billets and subjected to an adverse environment in use. In this manner, by determining their failure characteristics, parts will not be used that cannot withstand such adverse conditions.

There is a need to develop triaxial tensile stresses of a known and controllable magnitude in a solid billet of material to see if parts excized from this material can withstand certain critical thermal stresses in its intended environment.

SUMMARY OF THE PRESENT INVENTION

In accordance with the present invention, in one form, an axial force is generated by the action of centrifugal pressurization of a hydraulic fluid entrapped within a cylinder and piston mechanism incorporated as part of an axially rotated device. The device includes a solid cylindrical test billet fastened at each end to end caps. One end cap has a shoulder against which the billet-surrounding cylindrical housing is positioned to exert an axial force on the billet. Near the other end of the cylindrical housing is an inwardly directed annular flange forming a base for a hydraulic cylinder. Another end cap is fastened to the other end of the billet and has a stem which extends through the cylinder base. This stem is attached to a piston head which forms the movable or piston portion of the hydraulic cylinder. Centrifugal force on the hydraulic fluid exerts pressure in all directions. The axial component of the fluid pressure causes movement of the piston from the base, elongating or exerting a tension on the billet in an axial direction. As the billet and container are rotated, strain gages on the billet sense the radial, axial and circumferential strains, which are functions of the forces exerted on the billet.

BRIEF DESCRIPTION OF THE DRAWINGS

FIG. 1 is a sectional view of one form of triaxial stress device;

FIG. 2 is a force diagram illustrating stress directions on a test billet;

FIG. 3 is a sectional view of another form; and

FIG. 4 is a perspective view of the depressed housing of the modified form.

DETAILED DESCRIPTION OF ILLUSTRATIVE EMBODIMENTS

Reference is now made to FIG. 1 wherein there is shown a solid cylindrical test specimen or billet 10. This billet may be of some graphite composition or other test material for which stress data is needed to determine its suitability for structural purposes in a particular environment, for example. One end 12 of the billet is suitably fastened, such as by bonding or with a threaded connection, to an end cap 14. This end cap has an annular recess 16 against which one end 18 of a cylindrical housing or sleeve 20 is positioned. An axially positioned stem 22 extends from the outer surface 24 of end cap 14 to facilitate dynamic balancing of the assembly prior to rotation of the entire assembly. For example, stem 22 and stem 32 may be placed in journals on an apparatus (not shown) for actuating the rotation of this device for dynamic balancing purposes.

The other end 26 of billet 10 is fastened to another end cap 28 which has a post 30 extending outwardly and terminating in a stem 32 axially positioned to facilitate rotation. For example, the rotating actuation means 33 such as an air-driven turbine, for example, may be connected to stem 32. Sleeve 20 has an inwardly directed flange 34 near its end 36. This flange 34 has an opening 38 at its center to enable cap post 30 to protrude outwardly. A fluid tight fit between flange 34 and post 30 is obtained by a suitable seal such as an O-ring 40 which will permit limited axial movement of post 30 without excessive fluid leakage.

End 36 of sleeve 20 extends outwardly from flange 34 to form the walls of a hydraulic chamber 42, with flange 34 forming its base. The movable portion of chamber 42 is a piston head 44 attachable to post 30 and axially movable relative to cylinder end 36. An O-ring 46 between piston head 44 and end wall 36 permits limited movement of piston head 44 without excess fluid leakage. The fluid 48 within chamber 42 preferably is mercury since it has fluid weight responsive to centrifugal force. However, other fluids varying in specific gravity from that of mercury may be used to vary the ratio of axial tensile stress relative to the radial and circumferential stresses on the billet. The chamber surface 50 of flange 34 preferably is sloped to strengthen the flange 34 against the force of the centrifugally pressurized fluid and to minimize the deformation of cylinder end 36 during centrifugal loading. A port 52 in piston head 44 permits filling chamber 42 after assembly. Another port 52A allows air to be bled from the chamber 42 while filling.

This stress device is assembled by first attaching the test specimen or billet 10 to end caps 14 and 28. Cylinder sleeve 20 is inserted over post 30 and sleeve end 18 is positioned in cap recess 16. Piston head 44 is then fastened onto post 30 and slidably positioned over end 36 of cylinder 20. Cylinder chamber 42 is then filled with fluid and the device is then ready for its rotational test.

The instrumentation of this device to sense the forces is by means of strain gages on the billet surface. Since this is believed to be within the ability of a skilled artisan, details are not now provided. The apparatus for spinning the device also is not described for the same reason. However, angular velocities up to 60,000 rpm are desired to produce desired forces in some applications.

FIG. 2 is a force diagram of a test fragment and the forces acting on it. Here is shown a given fragment 10A of test billet 10. The circumferential forces or forces in a hoop direction are shown by arrows 54, 56. Radial stresses are shown by arrows 58, 60 and axial stresses are shown by arrows 62, 64. Centrifugal forces develop the circumferential and radial forces, and by hydraulic action of the fluid the centrifugal forces also generate the axial stresses. Both destructive and non-destructive testing is possible.

Reference is now made to an alternate embodiment shown in FIGS. 3 and 4. Here a test billet 66 is fastened at one end to a cap 68 which has an axial stem 70 extending from its outer surface. A radial flange 72 extends outwardly from the cap 68 to receive end 74 of sleeve 76. The other end of billet 66 has another cap 78 fastened to it with a stem 80 extending outwardly from the cap. A sleeve retainer 82 with an axial opening fits over stem 80 and they move axially together. As shown they are threadedly connected although other means may be provided. This sleeve retainer also has a radial flange 84 extending outwardly and has a diameter larger than that of billet 66 and cap 78. End 86 of sleeve 76 bears against this flange 84.

Sleeve 76 is biconic in nature in that its walls taper and extend inwardly from its ends 74, 86 to its mid-section 88. The thickness of the wall at mid-section 88 is less than at ends 74, 86 and 86 and so is the diameter less at the mid-section. Centrifugal force as the sleeve rotates causes the diameter at midpoint 88 to expand and thus apply tension to the billet 66 as caps 68 and 78 are stretched apart. The amount of tension, of course, depends upon the geometry and type of material of the sleeve, its mass distribution and the centrifugal force developed through its angular rotation. As shown in FIG. 4, longitudinal slots 90 in sleeve 76 permit circumferential enlargement of sleeve midpoint 88 without circumferential stresses in the sleeve.

Having thus described an illustrative embodiment of the present invention, it is to be understood that modifications thereof will become apparent to those skilled in the art and that these deviations are to be construed as part of the present invention.

I claim:

1. A triaxial tensile stress device for applying axial, radial and circumferential stresses to a solid cylindrical billet comprising:
    a first end cap with an axially positioned stem,
    a second end cap with an axially positioned stem,
    means fastening a solid cylindrical billet between said caps to apply axial tensile stress to said billet when said caps are moved further apart,
    means rotating said caps and billet about an axis defined by said stems to apply radial and circumferential stresses to said billet, and
    conversion means for applying separation forces between said caps as said caps are rotated.

2. A triaxial tensile stress device as in claim 1 wherein said conversion means is a hydraulic chamber having walls and base non-movable relative to said first end cap and a piston head non-movable relative to said second end cap, and a fluid in said chamber between said base, walls and piston head to move said piston head relative to said base when centrifugal force is applied to said fluid.

3. A triaxial tensile stress device as set forth in claim 2 wherein said chamber base has an outwardly directed slope.

4. A triaxial tensile stress device as set forth in claim 1 including a cylindrical sleeve positioned against said first end cap,
    said second end cap being slidably positioned over an end of said sleeve.

5. A triaxial tensile stress device as set forth in claim 4 wherein said sleeve has an inturned flange terminating in an axially positioned opening through which the stem of said second cap protrudes.

6. A triaxial tensile stress device as set forth in claim 5 wherein said inturned flange and said sleeve end form the base and wall of a hydraulic chamber, and a piston head is secured to said second end cap to transfer axial tensile stresses thereto upon outward movement of said piston head.

7. A triaxial tensile stress device as set forth in claim 6 wherein there is a fluid seal between said flange opening and said second cap stem and wherein there is another seal between said sleeve end and said piston head.

8. A triaxial tensile stress device as set forth in claim 1 wherein said conversion means is a biconic sleeve with the ends thereof abutting said end caps, said sleeve flexing circumferentially outwardly at its midportion during rotation thereof to cause elongation thereof when influenced by centrifugal force.

9. A triaxial tensile stress device as set forth in claim 8 wherein said sleeve tapers inwardly at its midsection to a smaller circumference than that at its ends, said sleeve also having walls of tapered thickness at its midsection and longitudinal slits therein to permit circumferential expansion thereof.

* * * * *